United States Patent [19]

Light

[11] 3,852,162
[45] Dec. 3, 1974

[54] DYNAMIC PRESSURIZED CONDENSING METHOD

[76] Inventor: George S. Light, P.O. Box 496, Winsted, Conn. 06098

[22] Filed: May 4, 1973

[21] Appl. No.: 357,333

[52] U.S. Cl.............. 203/10, 203/49, 202/185 R, 159/16 R, 165/111
[51] Int. Cl....... B01D 3/00, B01d 3/10, B01d 3/34, B01d 1/14
[58] Field of Search............ 159/13 A, 13 C, 14, 16; 203/10, 11, 49; 202/173, 185; 165/111

[56] References Cited
UNITED STATES PATENTS

| | | | |
|---|---|---|---|
| 509,749 | 11/1893 | Morrell | 159/13 C |
| 1,028,737 | 6/1912 | Kestner | 159/14 X |
| 1,067,010 | 7/1913 | Dunn | 159/26 |
| 2,519,618 | 8/1950 | Wilson et al. | 159/13 C X |
| 2,779,724 | 1/1957 | Dunning et al. | 159/13 C X |
| 3,168,450 | 2/1965 | Black | 202/185 |
| 3,236,748 | 2/1966 | Pottharst, Jr. | 203/11 |
| 3,259,552 | 7/1966 | Goeldner | 203/11 X |
| 3,326,778 | 6/1967 | Mock | 203/49 X |
| 3,334,026 | 8/1967 | Dobell | 203/10 |
| 3,410,758 | 11/1968 | Coanda | 203/11 X |
| 3,565,767 | 2/1971 | Light | 159/16 R |
| 3,766,020 | 10/1973 | Sieder | 203/11 X |

Primary Examiner—Jack Sofer
Attorney, Agent, or Firm—Prutzman, Haynes, Kalb & Chilton

[57] ABSTRACT

A dynamically strengthened system for condensing a condensable vapor in the presence of a noncondensable gas includes a chamber for mingling the vapor and gas and an enclosed condenser having a vapor condensing zone. During continuous operation of the system parcels of condensable vapor are intermingled with parcels of a noncondensing motivating gas within the mingling chamber, the gas having pressure force components and velocity force components sufficient to provide a dynamically strengthened condition for flow of the gas through the condenser independent of the condensable vapor. The intermingled vapor and gas is fed to the vapor condensing zone in its dynamically strengthened condition to cause turbulence and surface sweep within the condenser and removal of the heat transfer inhibiting film therein. The force components of the noncondensable gas cause continuous flow and discharge of the noncondensable gas from the condenser into the atmosphere or recirculation to the mingling chamber.

3 Claims, 3 Drawing Figures

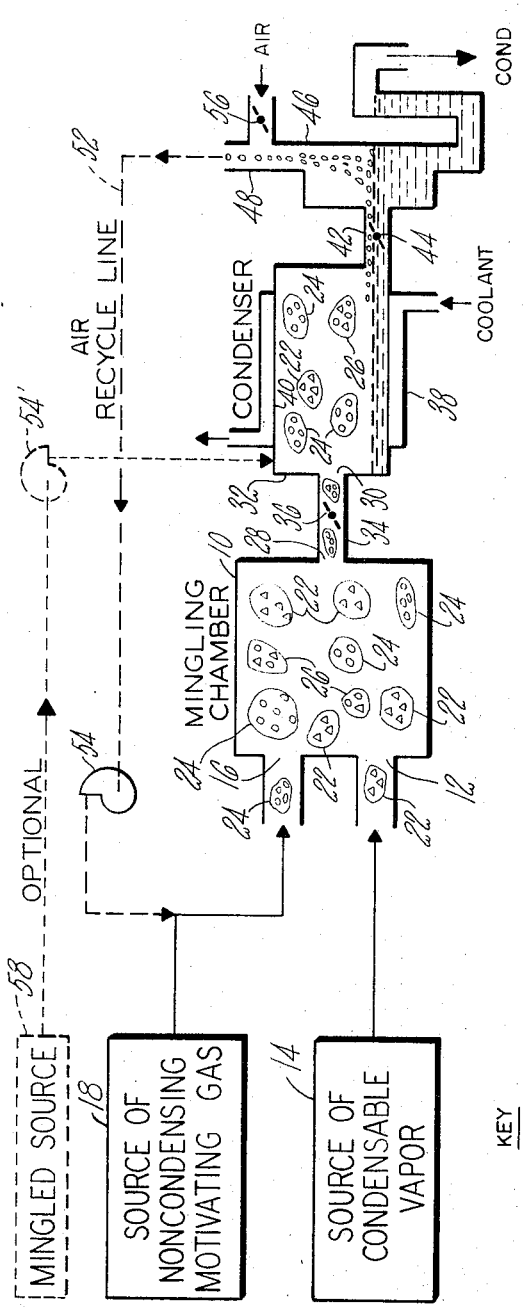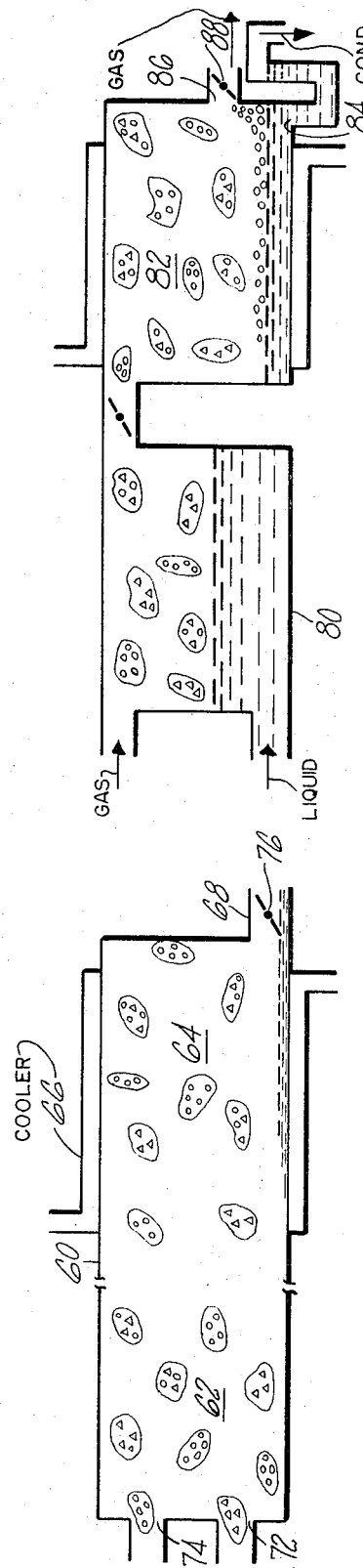

DYNAMIC PRESSURIZED CONDENSING METHOD

BACKGROUND AND SUMMARY OF THE INVENTION

The present invention relates generally to systems for condensing vapors. More particularly it is directed to new and improved dynamic pressure systems for enhancing the condensation of such vapors.

Heretofore, in condensation processes the infiltration of even trace amounts of a noncondensable gas component has been considered undesirable. As is known, the dynamic forces of the vapor in a condenser tend to decline along the length of the condenser due to the condensing operation. The infiltrating noncondensable gas is entrapped within the vapor during condensation and forms a part of an insulating or heat resisting film of condensate on the cooling surfaces of the condenser or a "dead" nondynamic gas pocket. Frequently, there is no provision for the disposal of this "dead" noncondensable gas inclusion resulting in a constant increase in the formation of the undesirable film and a reduction in the efficiency of the condenser. In fact it has been stated that the presence of even one percent by volume of air will reduce the condensation coefficient of steam by as much as 50 percent. This is attributed to the slow diffusion of the vapor through the air and the resistance of air to heat transfer to or from the vapor. Thus, the surface film containing gas entrapped therein is a heat transfer barrier particularly since the air particles allow passage of heat only by slow diffusion or mass transfer.

Accordingly, it is an object of the present invention to provide a new and improved system for enhancing the condensation of condensable vapors and improving the conductive and convective heat transfer within the condenser while obviating the effects of a heat transfer inhibiting film. Included in this object is the provision for the addition of positive gas flow within the pressurized condensing system that operates to promote the condensation operation.

Another object of the present invention is to provide a new and improved condensing system of greater efficiency that obviates the traditional difficulties heretofore associated with air entrapped in the condensed vapor through the elimination of nondynamic or "dead" air resulting from the progressive decrease in the motive forces of the vapor along the zone of condensation. Included in this object is the provision for continuous pressure and velocity forces throughout the condensation zone capable of creating sufficient turbulence and surface sweeping characteristics to reduce the tendency of the entrapped gas to form the efficiency killing film while simultaneously encouraging heat transfer and increasing efficiency at the condenser surfaces.

Other objects will be in part obvious and in part pointed out in more detail hereinafter.

These and related objects are accomplished by providing a system and method for condensing a condensable vapor in the presence of a noncondensable motivating gas that utilizes an intermingling chamber and an enclosed pressurizable condenser having cooling surfaces forming a vapor condensing zone. In this system a condensable vapor is intermingled with a noncondensing motivating gas that adds positive pressure and velocity force components sufficient to enhance flow of the condensable vapor through the condenser. The mingled parcels of vapor and gas are fed to the cooling surfaces of the condensing zone to continuously sweep the heat transfer inhibiting film from the cooling surfaces while maintaining the dynamics of the noncondensable gas and encouraging turbulent and sweeping action thereof.

A better understanding of the objects, advantages, features, properties and relationships of the invention will be obtained from the following detailed description and accompanying drawing which set forth an illustrative embodiment and are indicative of the way in which the principles of the invention are employed.

BRIEF DESCRIPTION OF THE DRAWING

In the drawing:

FIG. 1 is a schematic illustration of the dynamic condenser system of the present invention showing separate mixing and condensing chambers;

FIG. 2 is a schematic illustration of a system similar to FIG. 1 with the mixing and condensing functions combined within a single unit; and FIG. 3 is a schematic illustration of a condenser system similar to FIG. 1 wherein the mixing chamber includes a surface evaporator.

DESCRIPTION OF A PREFERRED EMBODIMENT

Although the system of the present invention is readily applicable to various condenser systems and processes, for ease of illustration and clarity of understanding it will be described in connection with a water vapor recovery system such as might be used in connection with a flash evaporator, power plant evaporator or the like. The system is also applicable to open pool evaporators and may be used in connection with the system described in my U.S. Pat. No. 3,565,767 issued Feb. 23, 1971, and entitled "Method And Apparatus For Removing Dissolved Impurities In Water," the disclosure of which is incorporated herein by reference.

Referring now to the drawing in greater detail wherein like reference numerals indicate like parts throughout the several figures, the condenser system of the present invention is illustrated as being comprised of a mingling chamber 10 having a first inlet port 12 for receiving a condensable vapor, such as water vapor, from a suitable source 14 and a second inlet port 16 for receiving a noncondensing motivating gas, such as air, from a separate source 18.

The air and water vapor are fed under pressure to the mingling chamber 10 where some intermingling occurs. As is known, the water vapor does not rapidly diffuse with the air even under the conditions within the mingling chamber and therefore as an aid in understanding the operation of the present invention, the gas and vapor have been depicted as separate parcels or bundles. Parcel 22 is depicted by a group of encircled triangles and represents discrete quantities or volumes of water vapor entering the mixing chamber 10 through the port 12. The parcels 22 are shown as being free of any noncondensing gas component and as having remained in a substantially undiffused state even though they are intermingled with other parcels within the mingling chamber. A second type of parcel 24 is depicted by the group of small circles and represents a quantity or volume of the noncondensing motivating gas, i.e., air, that likewise has not diffused with the condensable water vapor. Within the chamber 10 there is shown a number of parcels 26 containing both triangles and small circles. This third type of parcel represents those quantities of air and water vapor that have mixed by diffusion at least to some degree. However, it is a feature of the present invention that the noncondensing motivating gas, whether it be in parcels of undiffused, partially diffused or saturated character, provides a positive driving force within the mingling chamber 10 which is maintained during its passage through the entire condenser system even though the presence of the vapor may decline when condensing progresses.

A single outlet port 28 in the mingling chamber 10 is immediately adjacent and connected with an inlet port 30 of a condenser chamber 32 by means of a conduit 34 provided with a suitable pressure control valve, such as a throttle valve 36, to control the outlet of the intermingled parcels of vapor and gas entering the condenser chamber 32. A suitable cooling jacket 38 surrounds the cooling surfaces 40 of the condenser 32 and may be of conventional design so long as it is capable of withstanding the operating conditions utilized in the system. An exit conduit 42 communicating with the condenser chamber 32 is also provided with a suitable pressure control valve or gate 44 so as to control the pressurized condition within the condenser chamber 32 while simultaneously permitting continuous outward flow of the noncondensable gas component into the atmosphere. The exit conduit 42 is illustrated as being connected to a suitable discharge column 46 for drawing off the condensed liquid and permitting the exhaust of the motivating gas through its exhaust stack 48.

As illustrated, an optional feature involves recycling the noncondensing gaseous effluent from the condenser. In that arrangement a recycle line 52 is connected to the mingling chamber 10 and is provided with a recirculating pump 54 in order to provide the desired motivating characteristics of and velocity force components for the noncondensing gas as it re-enters the system without the addition of gas from source 18. The discharge or exhaust stack 48 is further provided with a side damper 56 which permits additional air to be fed into the recycle line 52 if necessary, so that operation of the recirculating pump 54 will not adversely affect the pressure conditions within the condenser 32.

Another optional arrangement uses a source 58 of premingled gas and vapor in conjunction with pump 54'. This source could include a low pressure line containing substantial air amounts due to faulty plumbing. Such a source would lack sufficient pressure and velocity components that could be provided by pump 54'. As shown, the mingled gas and vapor could be fed directly to the condenser 32.

In operation, the condensable water vapor that may contain entrapped air is fed under pressure from the source 14, such as a saline flash evaporator, open pool or surface evaporator, steam boiler or the like, into the mingling chamber 10. The amount and pressure of the vapor will vary with the source. As can be appreciated, there would be no mingling chamber in a conventional condenser and the vapor would flow directly into the condenser 32 where it would be condensed into its liquid form accompanied by the formation of the undesirable gas-entrapped film. As the condensation proceeds there would be a corresponding decrease in pressure so that at the exit of the condenser the pressure within the condenser would be approximately atmospheric pressure or below. However, in accordance with the present invention a noncondensing motivating gas, such as air possessing suitable pressure and velocity force components, is supplied to the mingling chamber 10 through inlet 16 from its source 18. Flow of the gas is continuous. The gas intermingles with the condensable water vapor in parcels depending on their dynamics rather than on slow diffusion or mass transfer. This mingling provides added dynamics to the system. This mixture of parcels is then fed through the conduit 34 under the constant flow of the gas and the control of the throttle valve 36. As the parcels enter chamber 32 their turbulent flow sweeps along the cooling surfaces 40 and condensation begins. As the vapor condenses the dynamics of the flow decreases; however the air parcels continue to drive and sweep the surfaces 40 to keep them free for continued condensing action. Thus, despite the condensation action taking place within the condenser 32, the noncondensable motivating gas supplies a positive pressurized condition to the condensing chamber. This positive pressure elevates the temperature at which condensation takes place and suppresses reflashing of the condensed vapor at the downstream, lower pressure areas of the condensing zone. Consequently, although there is a pressure gradient or drop along the condenser from a point adjacent its entrance port 30 toward the exit conduit 42, the noncondensable motivating gas maintains a positive pressure within the downstream portion of the condenser after all of the vapor has been substantially condensed. The condensing motive gas not only applies a positive static pressure component against the condensing zone, but also exhibits a dynamic or velocity component. As will be appreciated, the velocity component for the noncondensing motivating gas provides a flow or current that tends to set up turbulent eddy currents near the surface 40. It will be appreciated that the continuous flow of gas through the system that tends to sweep away any barrier film that may be formed on the condenser surfaces 40 further enhances both the conductive and convective heat transfer of the system. Additionally, the gate 44 modulates the flow and pressure drop best suited to the system and assures the constant presence of a positive pressure in the condenser. Of course, the many forces acting within the condenser are complex and the aforementioned discussion is not an attempt to fully discuss all such forces but merely highlight some of the more relevant forces.

The temperature of the noncondensing motive gas is generally lower than the temperature of the condensable vapor. Where the gas is recycled such as by pump 54, the temperature of the gas preferably should not exceed the temperature of the condensable vapor. Additionally, the recycled air, due to any inefficiency in the condensation operation, may contain some water vapor diffused therewith or may even be saturated at the discharge temperature. However, it is an advantageous feature of the present invention that the recycling of such air does not substantially interfere with the operation of the process. The primary consideration is that the motivating gas is supplied to the condenser at a positive pressure and passes through the condenser with a velocity component which permits the gas to perform a sweeping action and maintain the system in a continuous and dynamic condition. Thus, regardless of the moisture content of the noncondensable gas by diffusion or any other process, the gas provides a "live" quality through the condenser zone to effect a positive push or motivating force that not only sweeps the condenser but also promotes and motivates the condensation of the vapor within the condensing chamber.

It will be appreciated that the pressure of the motivating gas entering the mingling chamber should not be so excessive as to interrupt the flow of the condensable vapor into that chamber. However, at the same time, it will be appreciated that the pressure of the intermingled gas and vapor must be sufficiently high to provide the desired initial pressure level at the entrance port of the condenser in view of the pressure drop which necessarily occurs therein. Generally, the gas is adjusted to accommodate the vapor utilized. The volume of the noncondensable gas can be as little as 5 percent by volume. Although greater percentages tend to increase the dynamics as much as 100 percent by volume, it would be uneconomical.

Referring now to FIG. 2, there is illustrated a system similar to FIG. 1 with the separate mingling and condenser zones combined in a single chamber or unit. As shown in FIG. 2, a single tubular flow area or chamber 60 is provided with a mingling zone 62 and an integrally connected condensing zone 64, with the condensing zone provided with a suitable cooling jacket 66 and a downstream exit conduit 68 similar to the conduit 42 of FIG. 1. In a manner similar to FIG. 1, the mingling zone 62 of the combined unit is provided with dual entrance ports 72, 74 for the condensable vapor and noncondensing motivating gas respectively. It is believed that this arrangement is somewhat more economical to construct and utilizes only the single control valve or gate 76 to control the pressure within both the mingling and condensing zones of the system.

Referring now to FIG. 3, there is illustrated a condensing system similar to the system of FIG. 1 except that the mingling chamber 10 is replaced by a pressurized surface evaporator 80 of the type described in my U.S. Pat. No. 3,565,767, the disclosure of which is incorporated herein by reference. In this embodiment, the motivating air parcels mingle with the vapor parcels rising from the surface of the liquid being evaporated. The principal difference between the system shown in FIG. 3 and that described in the aforementioned patent is the pressurized condenser. The motivating air used in the surface evaporating chamber 80 of the present invention is permitted to flow into a condensing zone 82 in order to provide the desired motivated flow conditions within the condenser. Additionally, as will be noted, separate exit ports 84, 86 may be provided for the condensed liquid and motivating gas respectively with the exit port 86 for the motivating gas being controlled by a suitable throttle valve 88 in order to maintain the pressurized conditions within the condensing zone 82.

As will be apparent to persons skilled in the art, various modifications, adaptations, and variations of the foregoing specific disclosure can be made without departing from the teachings of the present invention.

I claim:

1. A method of condensing water vapor in the presence of air and removing a heat transfer inhibiting film from the condenser heat transferring surfaces comprising the steps of:
   a. providing an enclosed pressurizable condenser having cooling surfaces forming a vapor condensing zone whereon the heat transfer inhibiting film is formed;
   b. introducing intermingled but nondiffused parcels of water vapor and air by adding and intermingling parcels of motivating air having relatively higher pressure and velocity force components with parcels of water vapor to provide added dynamics to the flow of the water vapor through the condenser;
   c. immediately after intermingling feeding the intermingled relatively nondiffused vapor and air parcels against the cooling surfaces under said force components to condense some of said vapor and continuously sweep said heat transfer inhibiting film from said cool surfaces by said motivating air;
   d. maintaining the dynamics of the motivating air to encourage turbulence and the sweeping action thereof as the vapor content decreases during condensation while discharging the air from the condenser; and
   e. discharging the condensed water vapor from the condenser.

2. The method of claim 1 wherein the vapor and air are intermingled in a mingling chamber immediately adjacent the vapor condensing zone and at least a portion of the air flowing from the condenser is recirculated to said chamber.

3. The method of claim 1 wherein there is a constant pressure drop across the condenser and the air flowing from the condenser is at greater than atmospheric pressure.

* * * * *